(12) United States Patent
Yan et al.

(10) Patent No.: US 10,929,653 B2
(45) Date of Patent: Feb. 23, 2021

(54) METHOD FOR THE RECOGNITION OF A MOVING PEDESTRIAN

(71) Applicant: Aptiv Technologies Limited, St. Michael (BB)

(72) Inventors: Honghui Yan, Wuppertal (DE); Tao Zhang, Dusseldorf (DE); Wolfgang Doerr, Wiehl (DE); Alexander Ioffe, Bonn (DE)

(73) Assignee: Aptiv Technologies Limited, St. Michael (BB)

( * ) Notice: Subject to any disclaimer, the term of this patent is extended or adjusted under 35 U.S.C. 154(b) by 67 days.

(21) Appl. No.: 16/361,897

(22) Filed: Mar. 22, 2019

(65) Prior Publication Data
US 2019/0318162 A1 Oct. 17, 2019

(30) Foreign Application Priority Data

Apr. 11, 2018 (EP) .................................... 18166844

(51) Int. Cl.
*G06K 9/00* (2006.01)
*G01S 13/58* (2006.01)

(52) U.S. Cl.
CPC .......... *G06K 9/00348* (2013.01); *G01S 13/58* (2013.01); *G06K 9/00369* (2013.01)

(58) Field of Classification Search
CPC ............ G06K 9/00348; G06K 9/00369; G01S 2013/93271; G01S 13/58; G01S 13/46;
(Continued)

(56) References Cited

U.S. PATENT DOCUMENTS

| 4,958,638 A | 9/1990 | Sharpe et al. |
| 5,689,268 A | 11/1997 | Shi |

(Continued)

FOREIGN PATENT DOCUMENTS

| CN | 104360336 | 2/2015 |
| DE | 102014218092 | 3/2016 |

(Continued)

OTHER PUBLICATIONS

Yan et al: "Micro-Doppler Based Classifying Features for Automotive Radar VRU Target Classification", Jun. 5, 2017, 8 pages.
(Continued)

*Primary Examiner* — Marcos L Torres
(74) *Attorney, Agent, or Firm* — Colby Nipper PLLC

(57) ABSTRACT

A method for the recognition of a moving pedestrian by means of a radar sensor system includes the steps of transmitting a primary radar signal into an observation space and of receiving a secondary radar signal reflected by the moving pedestrian. The secondary radar signal is processed, wherein the processing of the secondary radar signal includes the steps of generating a Micro-Doppler spectrogram of the secondary radar signal, determining, based on the Micro-Doppler spectrogram, an observed bulk speed of the moving pedestrian, determining, based on the Micro-Doppler spectrogram, at least one gait cycle parameter of the moving pedestrian and determining, based on the determined observed bulk speed and the determined gait cycle parameter, an illumination angle between a moving direction of the moving pedestrian and the line of sight.

15 Claims, 7 Drawing Sheets

(58) Field of Classification Search
CPC ...... G01S 13/589; G01S 13/931; G01S 7/415; G01S 13/50; G01S 13/62
See application file for complete search history.

(56) References Cited

U.S. PATENT DOCUMENTS

| | | | |
|---|---|---|---|
| 6,121,916 | A | 9/2000 | McDade |
| 6,653,971 | B1 | 11/2003 | Guice et al. |
| 6,674,394 | B1 | 1/2004 | Zoratti |
| 8,854,251 | B2 | 10/2014 | Tokoro |
| 2002/0028003 | A1* | 3/2002 | Krebs ............... G06K 9/00348 382/115 |
| 2003/0225517 | A1 | 12/2003 | Schiffmann |
| 2010/0074379 | A1 | 3/2010 | Li |
| 2011/0102234 | A1 | 5/2011 | Adams et al. |
| 2013/0329523 | A1 | 12/2013 | Karl |
| 2014/0261887 | A1 | 9/2014 | Groot et al. |
| 2016/0054438 | A1 | 2/2016 | Patole et al. |
| 2016/0124087 | A1 | 5/2016 | Stainvas et al. |
| 2016/0259037 | A1 | 9/2016 | Molchanov et al. |
| 2016/0320853 | A1 | 11/2016 | Lien et al. |
| 2017/0057497 | A1 | 3/2017 | Laur et al. |
| 2017/0085771 | A1 | 3/2017 | Schwager et al. |
| 2017/0097413 | A1 | 4/2017 | Gillian et al. |
| 2017/0276788 | A1 | 9/2017 | Wodrich |
| 2017/0356991 | A1 | 12/2017 | Yosoku et al. |
| 2019/0137606 | A1 | 5/2019 | Buddendick et al. |
| 2020/0064444 | A1* | 2/2020 | Regani .................. G01S 7/415 |
| 2020/0124706 | A1 | 4/2020 | Buddendick et al. |
| 2020/0160046 | A1* | 5/2020 | Andreou ............ G06K 9/00563 |

FOREIGN PATENT DOCUMENTS

| | | |
|---|---|---|
| DE | 102015007040 | 12/2016 |
| DE | 102016213254 | 7/2017 |
| DE | 10 2016 215 102 A1 | 12/2017 |
| DE | 10 2016 213 007 A1 | 1/2018 |
| WO | 2017039862 | 3/2017 |

OTHER PUBLICATIONS

Li Fei et al: "Human gait recognition using micro-doppler features", May 27, 2012, p. 326-329.
"Extended European Search Report", EP Application No. 18166844.3, Oct. 9, 2018, 7 pages.
Caspar, "Performance Comparison Between a Camera Only AEB-FCW and a Camera-Radar Fusion Aeb-FCW", Sep. 2017, 8 pages.
Ghaleb, et al., "A refine Micro-Doppler Analysis of Pedestrians in ISAR Imaging", Jun. 2008, 4 pages.
Gurbuz, et al., "Operational Assessment and Adaptive Selection of Micro-Doppler Features", Dec. 2015, pp. 1196-1204.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.
Kim, et al., "Human Detection Using Doppler Radar Based on Physical Characteristics of Targets", Feb. 2015, pp. 289-293.
Lupfer, et aL, "Increasing FastSLAM Accuracy for Radar Data by Integrating the Doppler Information", Mar. 4, 2017, 4 pages.
Schafer, "What is a Savitzky-Golay Filter", Jul. 2011, 7 pages.
Van Dorp, et al., "Feature-based Human Motion Parameter Estimation with Radar", May 2008, pp. 135-145.
"Non-Final Office Action", U.S. Appl. No. 16/359,301, Dec. 7, 2020, 7 pages.

\* cited by examiner

METHOD FOR THE RECOGNITION OF A MOVING PEDESTRIAN

TECHNICAL FIELD OF INVENTION

The present invention relates to a method for the recognition of a moving pedestrian by means of a radar sensor system, wherein a primary radar signal is transmitted into an observation space, and a secondary radar signal reflected by the moving pedestrian is received and processed.

BACKGROUND OF INVENTION

Radar sensor systems are used in a wide range of applications. For example, modern motor vehicles are often equipped with radar sensor systems to detect other vehicles, obstacles or vulnerable road users such as pedestrians or cyclists. A detection and classification of objects in a traffic space from a host vehicle is in particular needed for various advanced driver assistance systems (ADAS), such as advanced emergency braking (AEB) systems, collision avoidance systems and autonomous driving systems. Often, the known Doppler effect is used to gather information relating to moving objects. The Doppler effect or Doppler shift is a change in frequency observed when a wave source moves relative to the receiver. In case of a pedestrian crossing the street in front of a motor vehicle, the Doppler effect is the less distinct, the closer the pedestrian approaches the center of the lane. In practice, it is therefore difficult to correctly identify pedestrians crossing the lane.

SUMMARY OF THE INVENTION

This disclosure describes techniques to enable a reliable recognition of moving pedestrians even under adverse circumstances.

In accordance with the invention, the processing of the secondary radar signal includes the steps:
(i) generating a Micro-Doppler spectrogram of the secondary radar signal;
(ii) determining, based on the Micro-Doppler spectrogram, an observed bulk speed of the moving pedestrian, wherein the observed bulk speed corresponds to a speed component that is related to the pedestrian's torso and is oriented along a line of sight extending from the moving pedestrian to the radar sensor system;
(iii) determining, based on the Micro-Doppler spectrogram, at least one gait cycle parameter of the moving pedestrian; and
(iv) determining, based on the determined observed bulk speed and the determined gait cycle parameter, an illumination angle between a moving direction of the moving pedestrian and the line of sight.

The Doppler frequency shift mainly results from the movement of the observed object as a whole, i.e. in case of an observed pedestrian from the movement of the pedestrian's torso. Beside this shift resulting from the main body movement, there usually are sidebands relating to moving parts of the object. For example, swinging arms or legs of a pedestrian can cause additional Doppler shifts. Such additional shifts are discernible in a Micro-Doppler spectrogram. The generation of Micro-Doppler spectrograms is disclosed, for example, in the book of Chen V. C., "*The Micro-Doppler Effect in Radar*", Artech House, 2011, or in the paper of Yan et al., "Micro-Doppler Based Classifying Features for Automotive Radar VRU Target Classification", 25$^{th}$ International Technical Conference on the Enhanced Safety of Vehicles (ESV), Jun. 5-8, 2017, Detroit, Mich., United States.

The superposition of Doppler shifts from each individual component is called a "Micro-Doppler-signature". Micro-Doppler-signatures can be analyzed to classify detected objects. The use of Doppler spectrograms for a discrimination of pedestrians is disclosed, for example, in the paper of Gürbüz S. Z. et al., "*Detection and Identification of Human Targets in Radar Data*", SPIE 6567, Signal Processing, Sensor Fusion and Target Recognition XVI, 656701, May 2007.

By means of a method in accordance of the invention, it is possible to determine the illumination angle in a quick and easy manner merely by analyzing the Micro-Doppler spectrogram. In the field of radar-based object recognition, the illumination angle is an important quantity to be used in various processing and evaluation steps. The knowledge of the illumination angle enables a particularly reliable detection of crossing pedestrians. In particular, the speed of a pedestrian in the moving direction can be calculated if the illumination angle is known.

In principle, the illumination angle can be estimated by means of an angle-finding process. Such a process, however, requires a multiple channel radar system, which is rather costly. In contrast, a method in accordance with the invention is not dependent on the presence of a multiple channel radar sensor and may be implemented directly in the range-Doppler domain. The invention thus enables the fabrication of low-cost pedestrian recognition systems.

Advantageous embodiments of the invention can be seen from the dependent claims, from the following description and from the appended figures.

Preferably, the speed of the moving pedestrian in the moving direction is determined based on the determined observed bulk speed and the determined illumination angle, in particular using the formula:

$$v = v^{ob}/\cos(\theta)$$

wherein v is the speed of the moving pedestrian in the moving direction, $v^{ob}$ is the observed bulk speed and $\theta$ is the illumination angle. In particular for an advanced driver assistance system, it is advantageous to know the speed of a detected pedestrian in the moving direction. For example, the potential danger of a traffic situation, in particular an imminent collision with the pedestrian, can be estimated if the speed of the pedestrian in the moving direction is known.

The Micro-Doppler spectrogram may be generated by means of a time-frequency analysis, in particular by means of a Short-Time-Fourier-Transform (STFT) or a Wigner-Ville-Distribution technique (WVD technique). Dependent on the application, the secondary radar signal or a signal derived from the secondary radar signal may be subjected to a time-frequency analysis.

The observed bulk speed can be determined by means of a percentile-based method or a curve-fitting method. Specifically, it is possible to calculate the cumulative amplitude distribution for each time slice and to determine the observed bulk speed to correspond to a percentile of about 50% of the cumulative amplitude distribution function. According to an embodiment of the invention, a percentile-based method or a curve-fitting method as disclosed in the paper of Gürbüz S. Z. et al., "*Operational assessment and adaptive selection of micro-Doppler features*", IET Radar Sonar Navig., Vol. 9, Iss. 9, pp. 1196-1204, 2015, may be used to determine the observed bulk speed.

Preferably, the at least one gait cycle parameter is an average duration of the pedestrian's gait cycle, an average gait cycle repetition frequency or a number of time bins related to one gait cycle. One gait cycle usually corresponds to two footsteps.

According to an embodiment of the invention, the at least one gait cycle parameter is determined by means of a Fourier analysis. A Fourier analysis enables the extraction of periodic components related to specific movements of body parts from the Micro-Doppler spectrogram.

Specifically, a Fast Fourier Transform (FFT) may be applied to an upper envelope and/or to a lower envelope of the Micro-Doppler spectrogram to estimate the gait cycle repetition frequency. The upper envelope and/or the lower envelope can be determined by means of a percentile-based method or a curve-fitting method as mentioned above. Specifically, it is possible to calculate the cumulative amplitude distribution for each time slice and to determine the upper envelope to correspond to a percentile of about 95% of the cumulative amplitude distribution function and/or to determine the lower envelope to correspond to a percentile of about 5% of the cumulative amplitude distribution function.

According to a further embodiment of the invention, the step (iv) includes relating the determined gait cycle parameter to the determined observed speed and to an estimated height of the moving pedestrian's thigh. The relationship to be used can be based on a kinematic human model.

The height of the moving pedestrian's thigh may be estimated based on a relationship between the height of the moving pedestrian's thigh and the overall height of the pedestrian, in particular based on the following relationship:

$$H_t \approx 0.53 \cdot H_{ped}$$

wherein $H_t$ is the height of the moving pedestrian's thigh and $H_{ped}$ is the overall height of the pedestrian. This simple relationship has proved to provide sufficiently precise results.

In accordance with an embodiment of the invention, the overall height of the moving pedestrian is estimated based on a statistical average height of pedestrians. It has shown that the typical height of pedestrians is between 1.2 m and 1.8 m. Therefore, $H_{ped}$ may be set to 1.5 m. This enables a simple calculation of the illumination angle.

In step (iv), the illumination angle may be estimated by means of a recursive state estimator, in particular an Extended Kalman Filter (EKF). By means of a recursive state estimator, it is possible to achieve a particularly high precision. The recursive state estimator may use a state vector including the illumination angle and the gait cycle parameter as well as a measurement vector including the observed bulk speed and the gait cycle parameter.

The invention also relates to a system for the recognition of a moving pedestrian comprising a radar sensor system for transmitting a primary radar signal into an observation space and for receiving a secondary radar signal reflected by the moving pedestrian and an electronic processing device for processing the secondary radar signal.

According to the invention, the electronic processing device is configured for carrying out a method as disclosed above.

Dependent on the application, the electronic processing device may be united with the radar sensor system or configured as a separate unit. The electronic processing device may comprise a computer.

Preferably, the radar sensor system is configured to be mounted at or in a motor vehicle.

The invention further relates to a computer program product including executable program code which, when executed, carries out a method as disclosed above.

The disclosure with reference to the inventive method is also true for the inventive system and the inventive computer program product.

Further features and advantages will appear more clearly on a reading of the following detailed description of the preferred embodiment, which is given by way of non-limiting example only and with reference to the accompanying drawings.

BRIEF DESCRIPTION OF DRAWINGS

Subsequently, the present invention is explained in more detail based on an exemplary embodiment with reference to the accompanying figures, wherein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
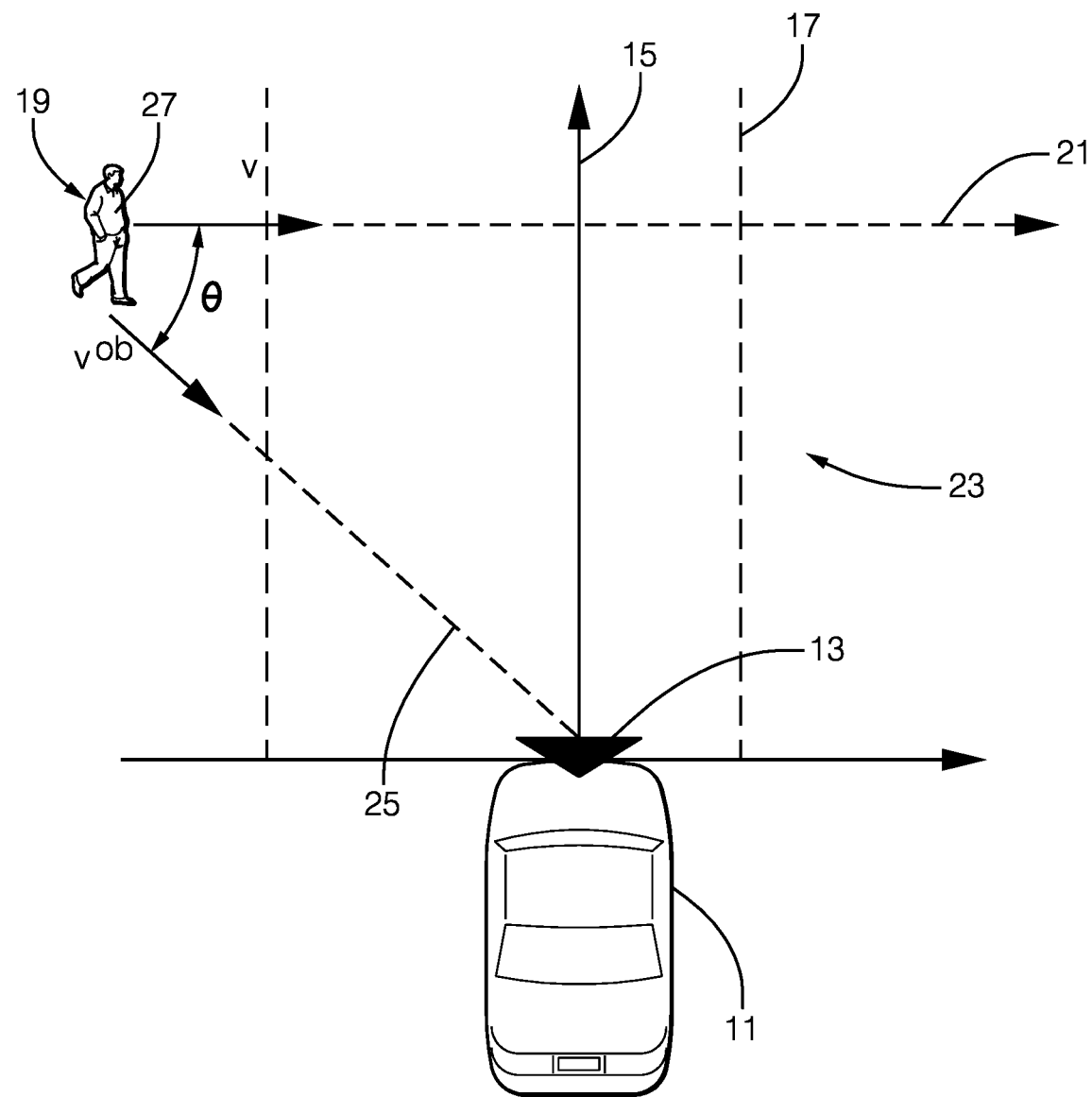
FIG. 1 shows, in a top view, a motor vehicle, a radar sensor system mounted to the motor vehicle and a pedestrian to be detected by the radar sensor system.

In FIG. 1, there is shown a motor vehicle 11 and a radar sensor system 13 mounted to a front section of the motor vehicle 11. The radar sensor system 13 is preferably based on a millimeter wave radar sensor. A single channel radar sensor is preferred to minimize the production costs. However, a multiple channel radar sensor may be provided to enhance the detection performance. The radar sensor system 13 can be connected to an electronic processing device (not shown), for example an advanced emergency braking system, a pedestrian collision avoidance system or an autonomous driving system.

In operation, the motor vehicle 11 is moving in a driving direction 15 on a lane 17. A pedestrian 19 crossing the lane 17 is moving in a moving direction 21. The moving direction 21 is at least essentially perpendicular to the driving direction 15. In principle, the moving direction 21 may be inclined to the driving direction 15.

The radar sensor system 13 is configured for transmitting a primary radar signal into the traffic space 23 in front of the motor vehicle 11 and for detecting pedestrians 19 present in the traffic space 23 on the basis of a secondary radar signal reflected by the pedestrians 19. The line 25 which extends from the pedestrian 19 to the active region of the radar sensor system 13 is called "line of sight". The observed bulk speed $v^{ob}$ of the pedestrian 19, i. e. the speed component related to the pedestrian's torso 27 and oriented along the line of sight 25, can be determined in a known manner using the Doppler effect. Specifically, it is known that the relationship between the observed bulk speed $v^{ob}$ and the pedestrian's speed v in the moving direction 21 is given as:

$$v = v^{ob}/\cos(\theta) \tag{1}$$

wherein θ is the illumination angle, i. e. the angle between the moving direction 21 and the line of sight 25.

According to the invention, the illumination angle θ and the speed v are determined on the basis of a Micro-Doppler spectrogram analysis by means of the electronic processing device, as is explained in greater detail below.

Figure 2:
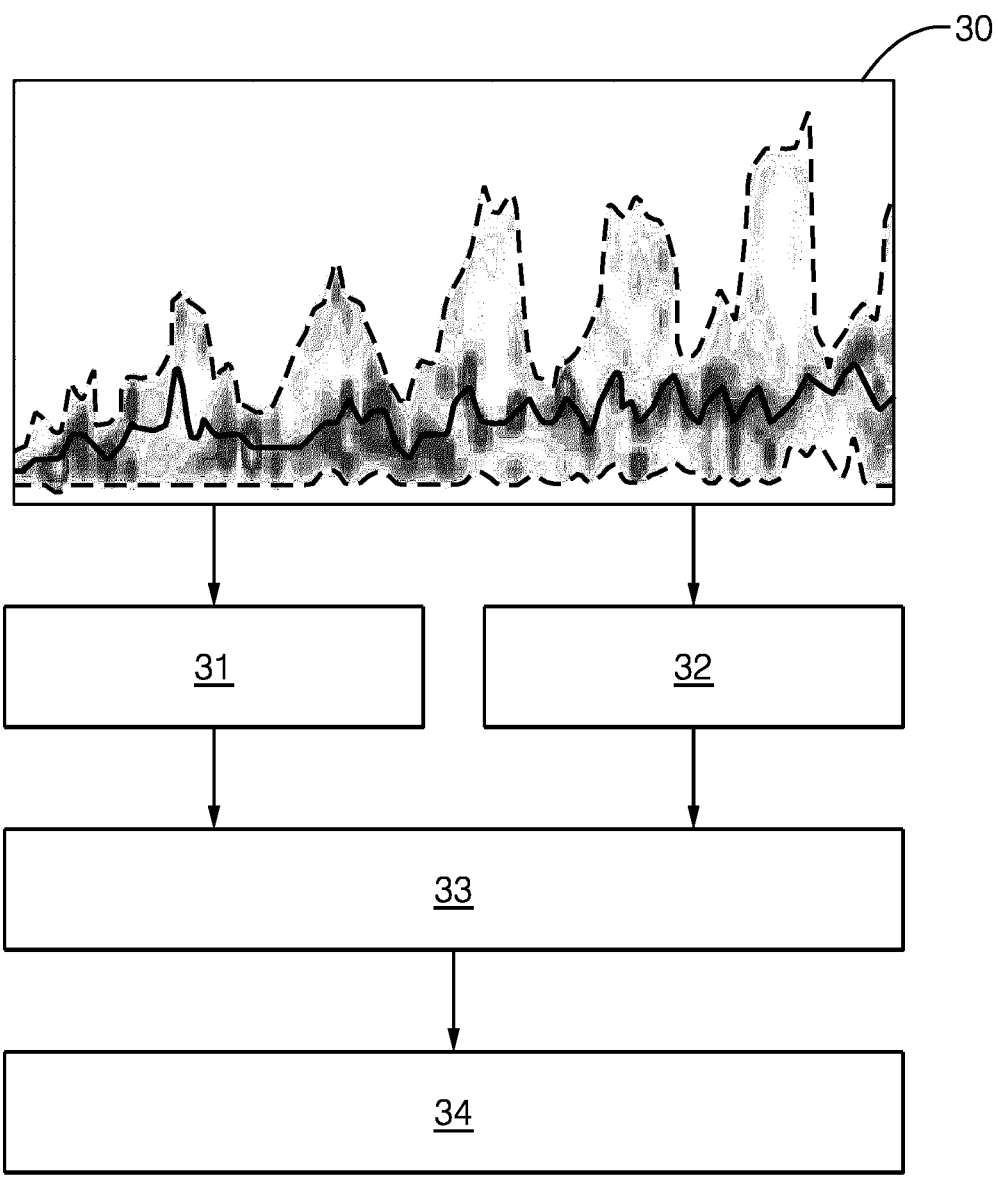
FIG. 2 is a flowchart showing different steps of a method according to an embodiment of the invention.

As shown in FIG. 2, a Micro-Doppler spectrogram 30 is generated as an input for the subsequent steps. In a step 31, the observed bulk speed $v^{ob}$ of the moving pedestrian 19 is determined based on the Micro-Doppler spectrogram 30. In a step 32, a gait cycle parameter in form of a gait cycle duration $T_{gaitcycle}$ of the moving pedestrian 19 is determined based on the Micro-Doppler spectrogram 30. In a step 33, the illumination angle θ is determined based on the observed bulk speed $v^{ob}$ as determined in step 31 and the gait cycle parameter $T_{gaitcycle}$ as determined in step 32. In a step 34, the speed v of the moving pedestrian 19 in the moving direction 21 (FIG. 1) is determined based on the observed bulk speed $v^{ob}$ as determined in step 31 and the illumination angle θ as determined in step 33.

Figure 3:
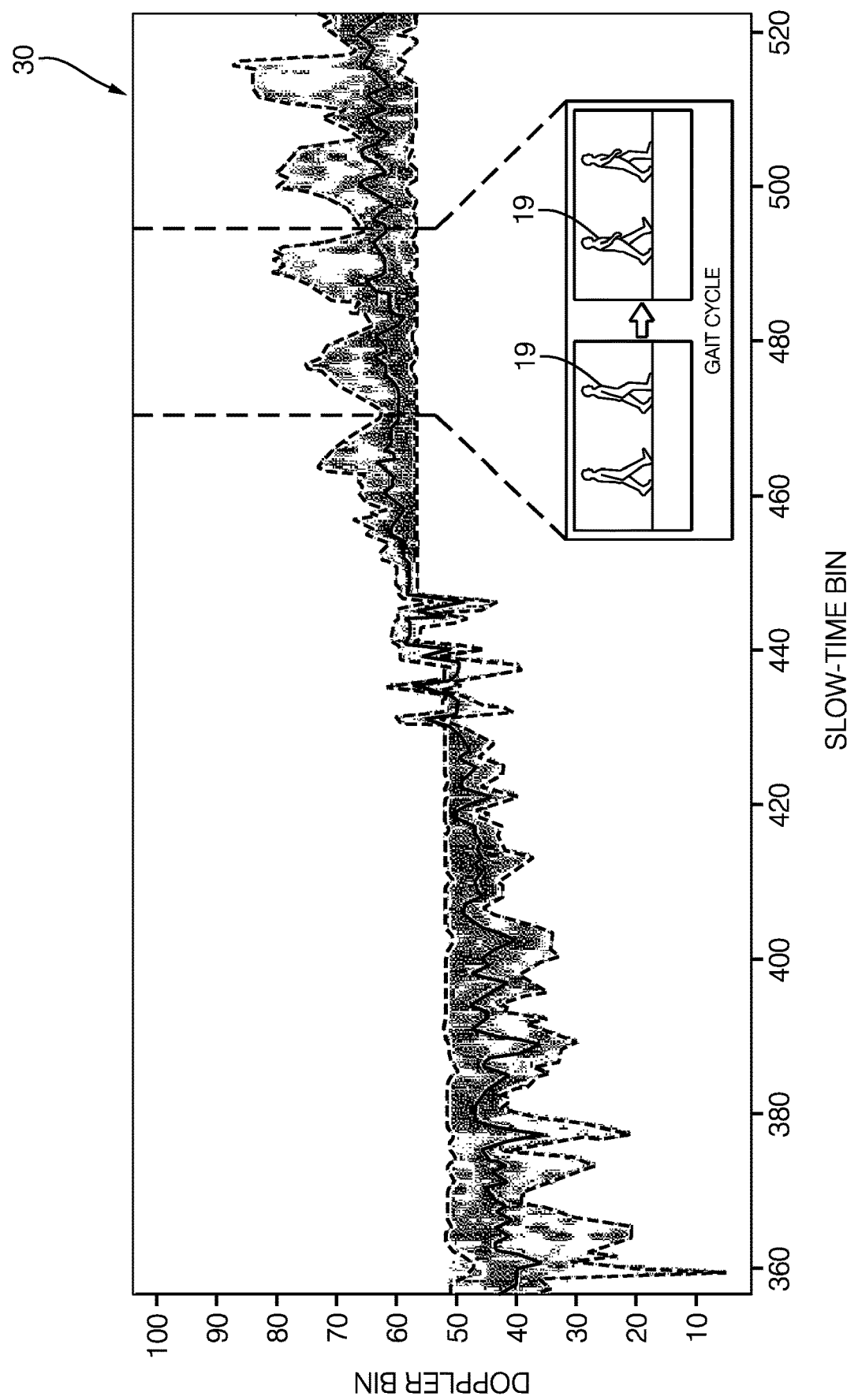
FIG. 3 shows a Micro-Doppler spectrogram generated by the radar sensor system according to FIG. 1.

The generation of the Micro-Doppler spectrogram 30 is carried out by means of a Short-Time-Fourier-Transform (STFT) or a Wigner-Ville-Distribution technique (WVD technique). An exemplary Micro-Doppler spectrogram 30 is shown in FIG. 3. The horizontal axis is a time axis, whereas the vertical axis is a Doppler shift axis. In the right portion of FIG. 3, there is indicated a segment of the Micro-Doppler spectrogram 30 that corresponds to a gait cycle of the pedestrian 19. A gait cycle lasts from a ground contact of a certain foot to the next ground contact of this foot and thus usually corresponds to two consecutive footsteps. The periodic movement of the feet during walking generates an at least essentially periodic pattern in the Micro-Doppler spectrogram 30.

Figure 4:
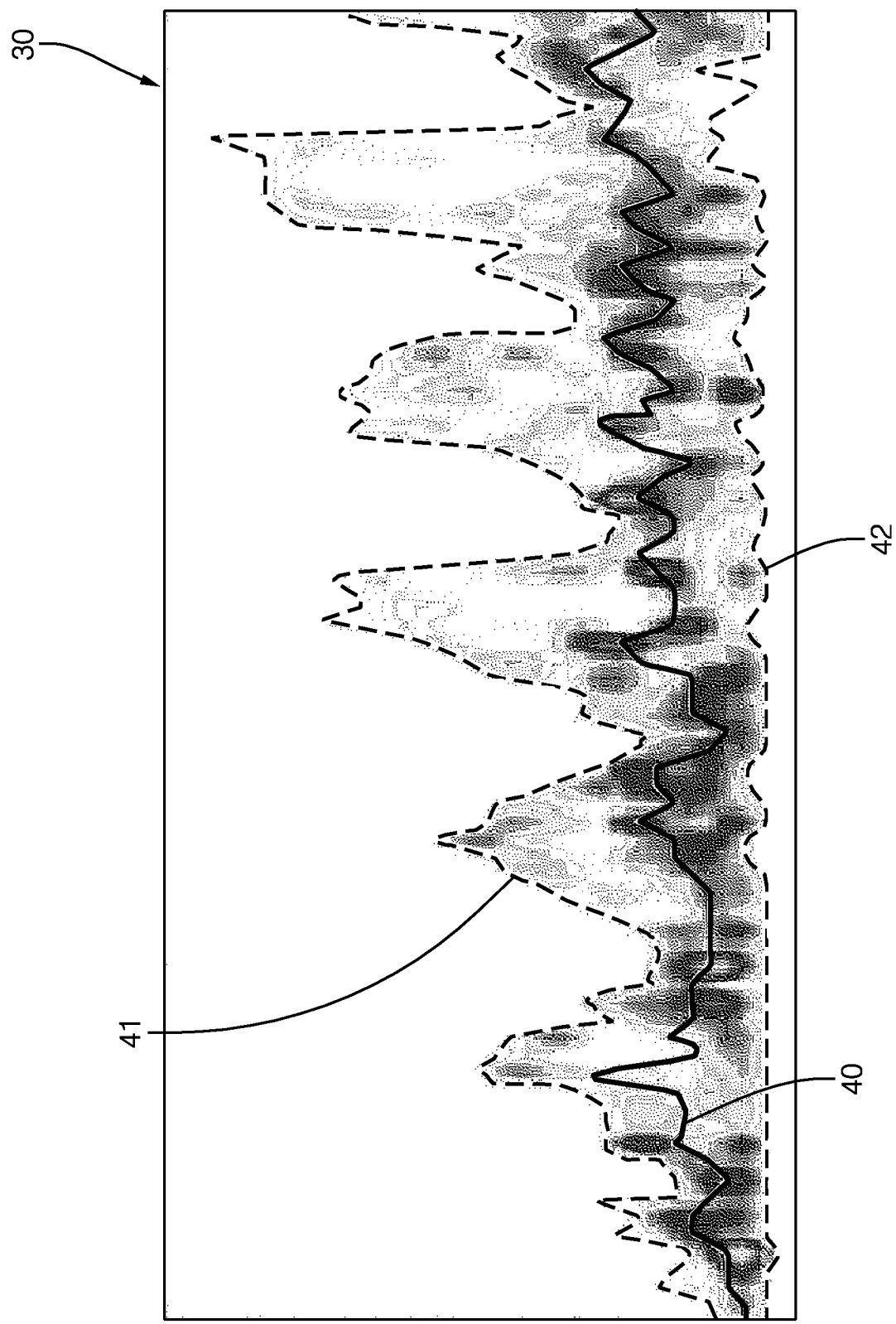
FIG. 4 shows an enlarged section of the Micro-Doppler spectrogram according to FIG. 3 in inverted gray levels.

FIG. 4 shows the right portion of the Micro-Doppler spectrogram 30 according to FIG. 3 in an enlarged view. Three curves corresponding to the courses of different motion components are shown in the Micro-Doppler spectrogram 30. Specifically, the course 40 of the observed bulk speed $v^{ob}$ is shown as a solid black line, whereas the upper envelope 41 of the Micro-Doppler spectrogram 30 and the lower envelope 42 of the Micro-Doppler spectrogram 30 are shown as dashed lines.

To determine the course 40 of the observed bulk speed $v^{ob}$, the upper envelope 41 and the lower envelope 42, the cumulative amplitude distribution function is determined for each time slice. The course 40 of the observed bulk speed $v^{ob}$ is assigned to a percentile of about 50% of the cumulative amplitude distribution function. The upper envelope 41 is assigned to a percentile of about 95% of the cumulative amplitude distribution function, whereas the lower envelope 42 is assigned to a percentile of about 5% of the cumulative amplitude distribution function.

By applying a Fast Fourier Transform (FFT) onto the upper envelope 41 and the lower envelope 42, the repetition frequency of the gait cycle is estimated. The duration of the gait cycle $T_{gaitcycle}$ is the reciprocal of the repetition frequency of the gait cycle.

According to a kinematic model disclosed in the book of Chen V. C., "The Micro-Doppler Effect in Radar", Artech House, 2011, the duration of the gait cycle $T_{gaitcycle}$ can be expressed as:

$$T_{gaitcycle} = \frac{1.346}{\sqrt{v/H_t}} \tag{2}$$

wherein $H_t$ is the height of the pedestrian's thigh. Generally, the height of the pedestrian's thigh $H_t$ can be expressed as:

$$H_t \approx 0.53 * H_{ped} \tag{3}$$

wherein $H_{ped}$ is the pedestrian's height.

Supposing that the time resolution of the Micro-Doppler spectrogram 30 is $\rho_{Timebin}$, there are $N_{gaitcycle}$ time-bins contained in one gait-cycle:

$$N_{gaitcycle} = \frac{T_{gaitcycle}}{\rho_{Timebin}} = 2N_{footstep} \tag{4}$$

wherein $N_{footstep}$ is the number of time-bins contained in a segment corresponding to one footstep. In equation (4), the factor 2 accounts for the above mentioned fact that usually one gait-cycle comprises two footsteps.

A combination of equations (1)-(4) delivers:

$$vN_{footstep}^2 = KH_{ped} \quad (5)$$

$$v^{ob}N_{footstep}^2 = KH_{ped}\cos(\theta) \quad (6)$$

wherein K is a constant for a given spectrogram:

$$K = 0.53 * \left[\frac{1.346}{2 * \rho_{Timebin}}\right]^2 \quad (7)$$

From equation (6), it follows:

$$\cos(\theta) = \frac{v^{ob}N_{footstep}^2}{KH_{ped}} \quad (8)$$

If $H_{ped}$ is known, the illumination angle $\theta$ can be determined from equation (8). One variant for calculating the illumination angle $\theta$ is to use equation (8) and to set $H_{ped}$ as the statistical average pedestrian height $H_{ped\_avg}$ for the dedicated application scenario. The angle estimation error induced by the unknown pedestrian height is:

$$\partial\theta \approx -\frac{v_{ped}^{ob}N_{footstep}^2}{KH_{ped\_avg}^2}(H_{ped} - H_{ped\_avg}) \quad (9)$$

Figure 5:
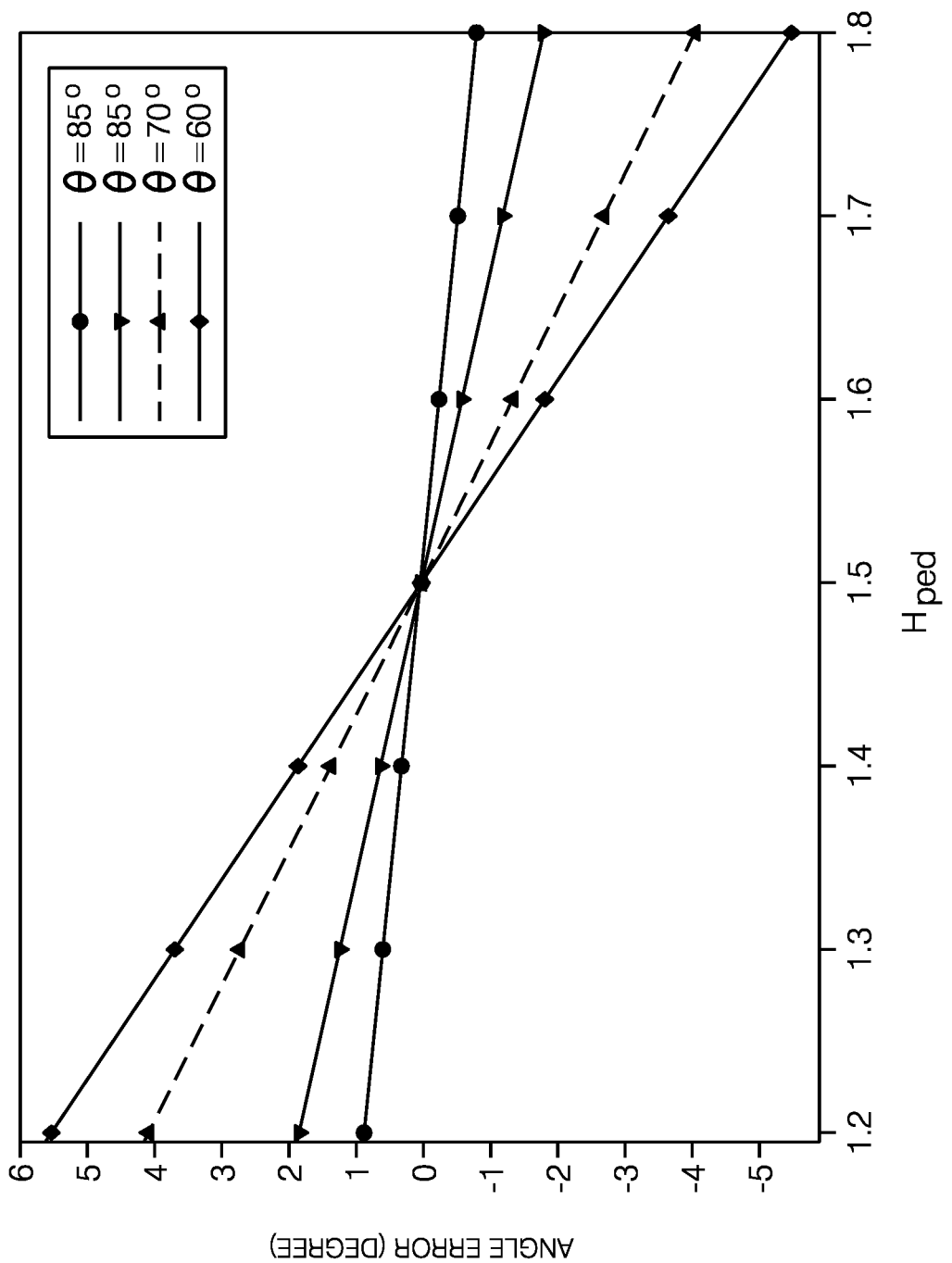
FIG. 5 shows an estimated angle error induced by an unknown pedestrian height.

In FIG. 5, it is shown that the angle estimation error is be below 6° for an illumination angle $\theta$ varying between 60° and 120°, which is sufficient for most applications. The closer the pedestrian height approaches $H_{ped\_avg}$, the less is the estimation error. For most crossing pedestrian scenarios, the illumination angle $\theta$ is always between 60° and 120°.

Another variant of estimating the illumination angle $\theta$ is to use a recursive state estimator such as an Extended Kalman Filter (EKF). The use of such a recursive state estimator enables a more precise estimation of the illumination angle $\theta$ than the above mentioned variant using an average pedestrian height.

In an algorithm based on an Extended Kalman Filter, the state space model of $\theta$ and the measurement model of $v^{ob}$ can be given as:

$$\begin{bmatrix} \theta_n \\ \dot{\theta}_n \\ N_{footstep,n} \\ H_{ped,n} \end{bmatrix} = \begin{bmatrix} 1 & \rho_{Timebin} & 0 & 0 \\ 0 & 1 & 0 & 0 \\ 0 & 0 & 1 & 0 \\ 0 & 0 & 0 & 1 \end{bmatrix} \begin{bmatrix} \theta_{n-1} \\ \dot{\theta}_{n-1} \\ N_{footstep,n-1} \\ H_{ped,n-1} \end{bmatrix} + w_1 \quad (10)$$

$$\begin{bmatrix} v_n^{ob} \\ N_{footstep,n} \end{bmatrix} = \begin{bmatrix} KH_{ped,n}\cos(\theta_n)/N_{footstep,n}^2 \\ N_{footstep,n} \end{bmatrix} + q \quad (11)$$

wherein the random variables $w_{n-1}$ and $q_n$ represent the process noise and the measurement noise. The subscripts n, n-1 indicate the current state and the previous state, respectively. The dot refers to the derivative of $\theta$.

Figure 6:
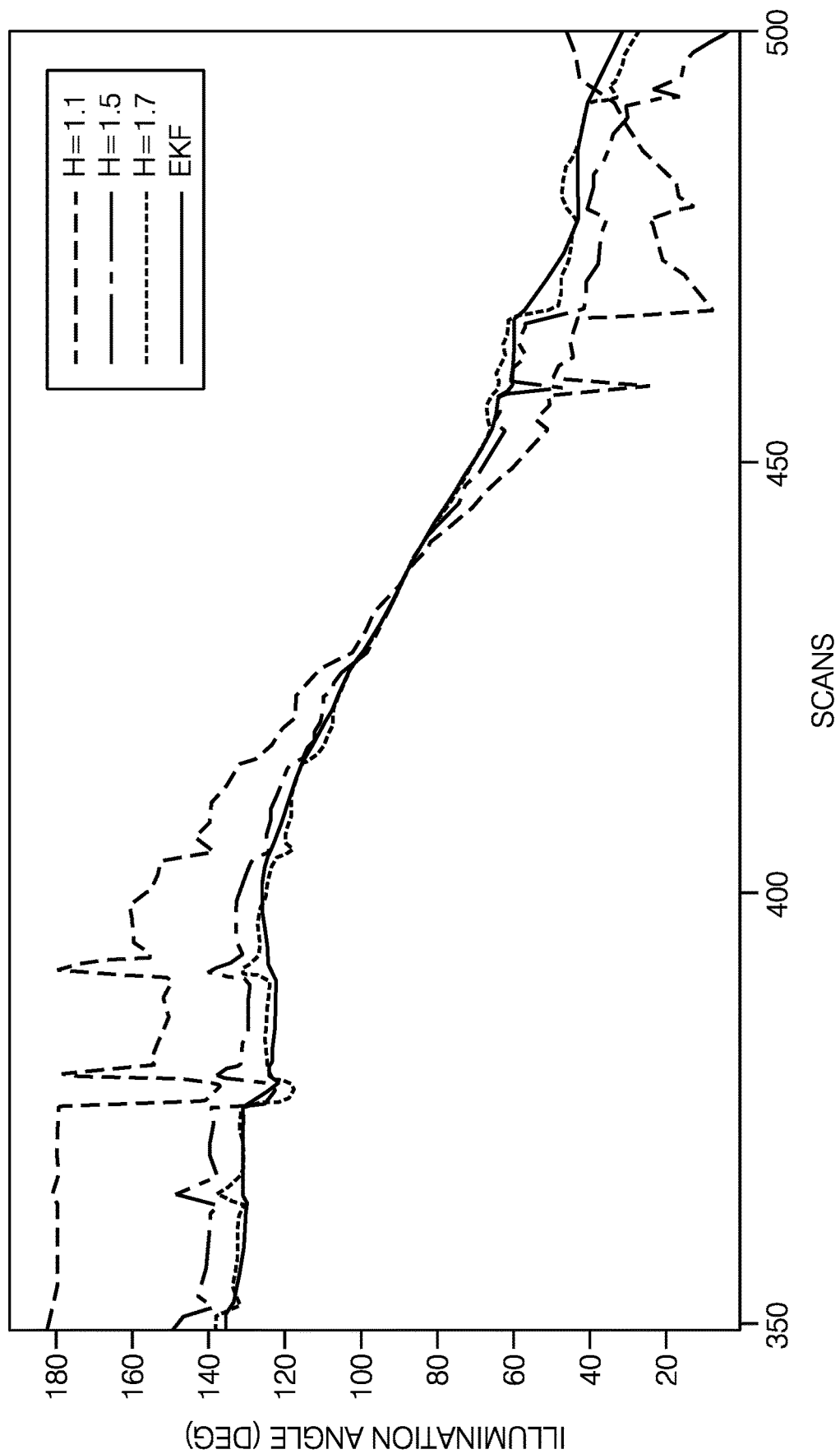
FIG. 6 shows an estimated illumination angle over time.

Using equation (10) and equation (11), the illumination angle theta $\theta$ can be estimated. FIG. 6 shows the estimated illumination angle $\theta$ for a series of scans of the radar sensor system 13 (FIG. 1). The EKF based method provides a more reliable estimation than methods based on exemplary fixed heights.

After determining the illumination angle $\theta$, the speed v of the pedestrian 19 in the moving direction 21 can be determined by rearranging formula (1):

$$v = v^{ob}/\cos(\theta) \quad (12)$$

Figure 7:
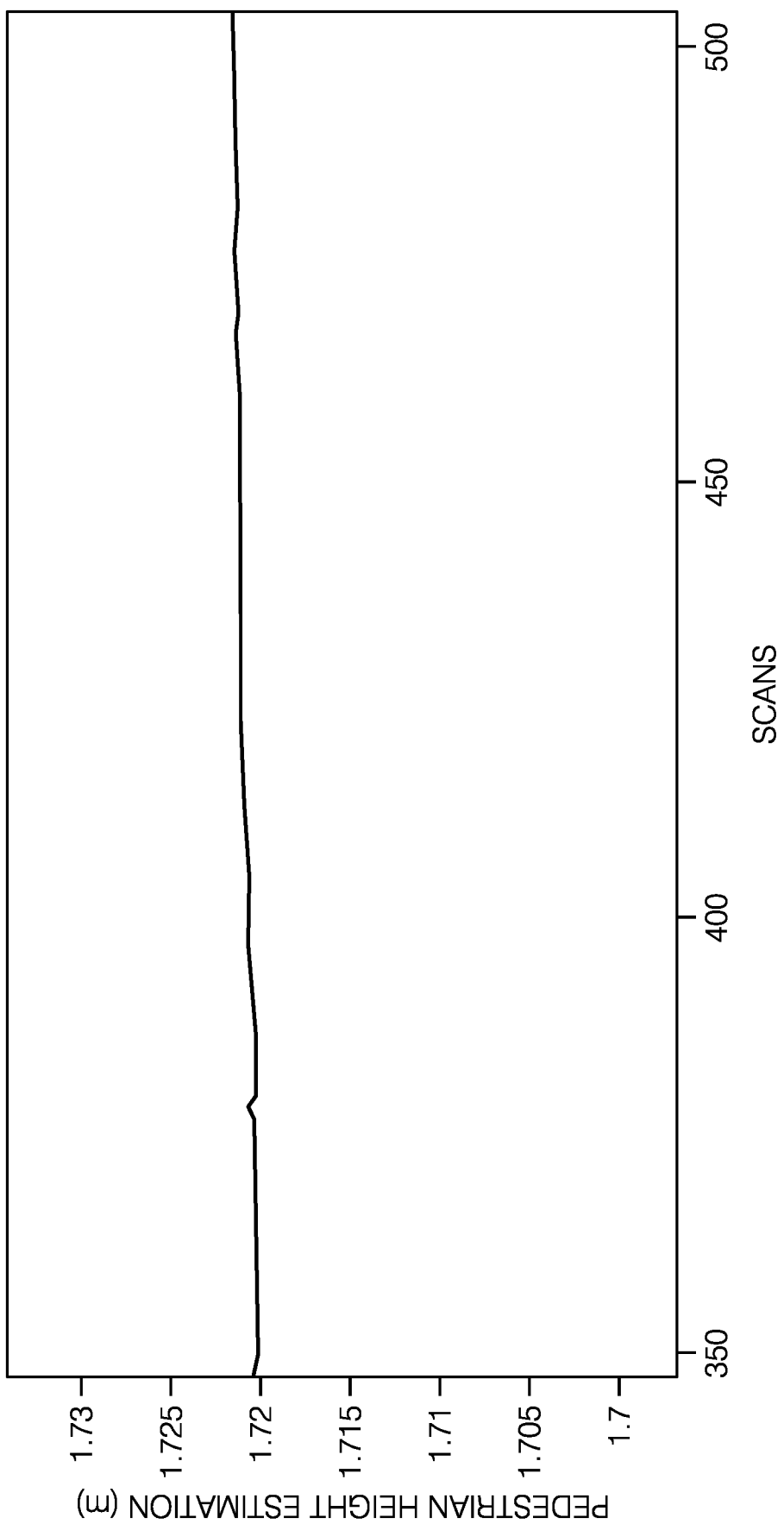
FIG. 7 shows a pedestrian height estimated by an Extended Kalman Filter over time.

Since $H_{ped}$ is a component of the state vector of the EKF as given in equation (10), it can also be estimated by the EKF. An example of such an estimation is shown in FIG. 7. An estimation of Hped by an EKF enables an estimation of the speed v of the pedestrian 19 in the moving direction 21 using equation (5):

$$v = KH_{ped}/N_{footstep}^2 \quad (13)$$

The invention enables a reliable recognition of moving pedestrians by means of a radar sensor system without the necessity to use complex and expensive hardware. While this invention has been described in terms of the preferred embodiments thereof, it is not intended to be so limited, but rather only to the extent set forth in the claims that follow.

We claim:

1. A method for the recognition of a moving pedestrian by means of a radar sensor system, wherein
   transmitting a primary radar signal into an observation space; and
   receiving a secondary radar signal reflected by the moving pedestrian; and
   processing the secondary radar signal, wherein processing the secondary radar signal includes the steps:
   (i) generating a Micro-Doppler spectrogram of the secondary radar signal;
   (ii) determining, based on the Micro-Doppler spectrogram, an observed bulk speed of the moving pedestrian, wherein the observed bulk speed corresponds to a speed component that is related to the pedestrian's torso and is oriented along a line of sight extending from the moving pedestrian to the radar sensor system;
   (iii) determining, based on the Micro-Doppler spectrogram, at least one gait cycle parameter of the moving pedestrian; and
   (iv) determining, based on the determined observed bulk speed and the determined gait cycle parameter, an illumination angle between a moving direction of the moving pedestrian and the line of sight.

2. A method in accordance with claim 1, wherein
   the speed of the moving pedestrian in the moving direction is determined based on the determined observed bulk speed and the determined illumination angle using the formula v=vob/cos($\theta$), wherein v is the speed of the moving pedestrian in the moving direction, vob is the observed bulk speed and $\theta$ is the illumination angle.

3. A method in accordance with claim 1, wherein
   the Micro-Doppler spectrogram is generated by one of a Short-Time-Fourier-Transform and a Wigner-Ville-Distribution technique.

4. A method in accordance with claim 1, wherein
   the observed bulk speed is determined by means of a percentile-based method or a curve-fitting method.

5. A method in accordance with claim 1, wherein
   the at least one gait cycle parameter is an average duration of the pedestrian's gait cycle, an average gait cycle repetition frequency or a number of time bins related to one gait cycle.

6. A method in accordance with claim 1, wherein the at least one gait cycle parameter is determined by means of a Fourier analysis.

7. A method in accordance with claim 6, wherein a Fast Fourier Transform is applied to an upper envelope and/or to a lower envelope of the Micro-Doppler spectrogram to estimate the gait cycle repetition frequency.

8. A method in accordance with claim 1, wherein step (iv) includes relating the determined gait cycle parameter to the determined observed speed and to an estimated height of the moving pedestrian's thigh.

9. A method in accordance with claim 8, wherein a relation is used which is based on a kinematic human model.

10. A method in accordance with claim 8, wherein the height of the moving pedestrian's thigh is estimated based on a relationship between the height of the moving pedestrian's thigh and the overall height of the pedestrian, in particular based on the relationship $Ht \approx 0.53 \cdot Hped$, wherein Ht is the height of the moving pedestrian's thigh and Hped is the overall height of the pedestrian.

11. A method in accordance with claim 10, wherein the overall height of the moving pedestrian is estimated based on a statistical average height of pedestrians.

12. A method in accordance with claim 1, wherein in step (iv), the illumination angle is estimated by means of a recursive state estimator.

13. A system for the recognition of a moving pedestrian comprising:
a radar sensor system for transmitting a primary radar signal into an observation space and for receiving a secondary radar signal reflected by the moving pedestrian; and
an electronic processing device for processing the secondary radar signal, wherein
the electronic processing device is configured for carrying out a method in accordance with claim 1.

14. A system in accordance with claim 13, wherein the radar sensor system is configured to be mounted at or in a motor vehicle.

15. A non-transitory computer program product including executable program code which, when executed, carries out a method in accordance with claim 1.

* * * * *